Figure 1:
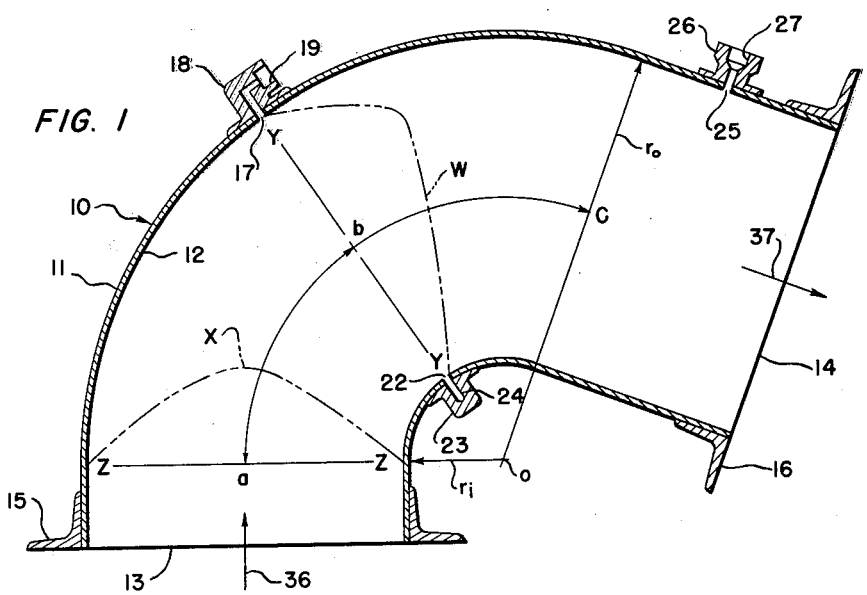

Dec. 11, 1962    K. BOWERS ET AL    3,067,611
FLOW METERING APPARATUS
Filed Nov. 9, 1959

INVENTORS
KENNETH BOWERS
PHILIP S. VINCELETT
BY
*Walter J. Jason*
ATTORNEY

United States Patent Office 3,067,611
Patented Dec. 11, 1962

3,067,611
FLOW METERING APPARATUS
Kenneth Bowers, La Mesa, and Philip S. Vincelett, San Diego, Calif., assignors to General Dynamics Corporation (Convair Division), San Diego, Calif., a corporation of Delaware
Filed Nov. 9, 1959, Ser. No. 851,603
1 Claim. (Cl. 73—214)

The present invention generally relates to fluid flow metering apparatus, and more particularly relates to an elbow type flow metering apparatus which utilizes the fluid pressure difference produced transversely across an elbow member by a fluid flowing longitudinally through the elbow.

Somewhat more conventional flow metering devices are venturi tube and orifice type devices. These devices, however, produce a considerable pressure drop in any system in which they are used, thus obstructing the flow of fluid through the system. Further, these more conventional metering devices are precluded from use in many areas because of their bulk and weight.

In contrast, the present invention does not obstruct the flow of fluid or otherwise cause any appreciable pressure drop in a fluid flow system. The present invention is also relatively small in bulk and light in weight, thus being ideally suited for use with missiles and aircraft. One particular application for the present invention is the determination of the weight of gaseous oxygen which boils off liquid oxygen during tanking operations. While missile or aircraft tanks are being filled with liquid oxygen, an appreciable amount of the liquid oxygen is lost through evaporation, or boil off. As a consequence, the amount of "liquid" oxygen finally stored in the missile or aircraft tank is not the same as that amount which was pumped from the reservoir or source into the tank. The present invention has been used to accurately measure the weight of the liquid oxygen lost by evaporation. In so doing it also serves as a portion of a vent for the escaping gaseous oxygen. As such a vent it does not impose flow restrictions that would be imposed by venturi tube or orifice type metering devices. This characteristic is of considerable importance since tanking rates presently achieved are in the order of many thousands of gallons per minute, and a restricting gas vent could often result in harmful pressure build-ups in the tank.

Thus it can be seen why one object of the present invention is to provide a means for accurately measuring fluid flow.

Another object is to provide a means for accurately measuring weight of fluid flow.

Another object is to provide a means for accurately measuring fluid flow and weight of fluid flow without imposing any appreciable fluid flow restriction.

Another object is to provide a lightweight apparatus for accurately measuring fluid flow and weight of fluid flow without imposing any appreciable fluid flow restriction.

Figure 2:
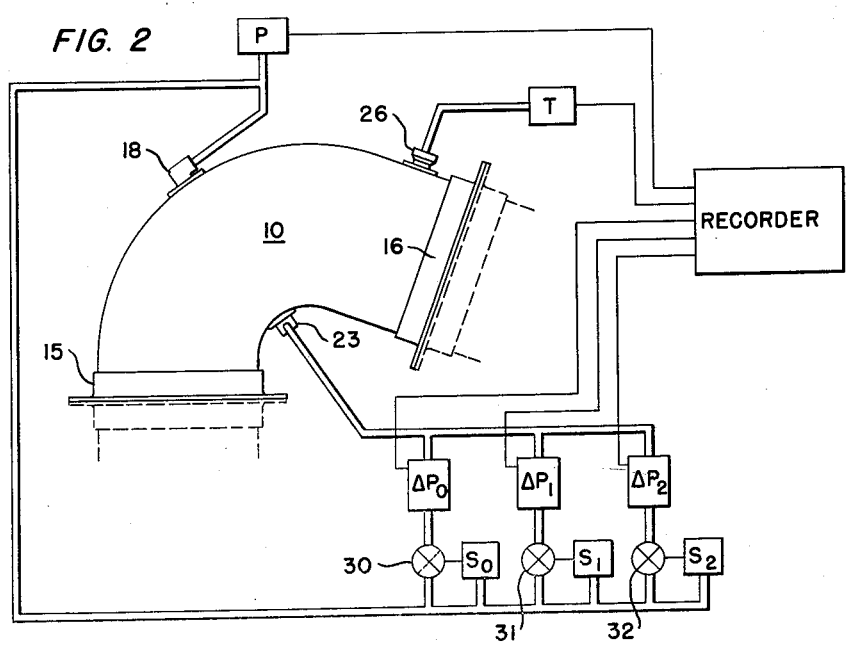

And still other objects and features of the present invention will be readily apparent to those skilled in the art from the following specification and appended drawings wherein is illustrated a preferred form of the invention, and in which:

FIGURE 1 is a cross-sectional view of an elbow type duct member with pressure and temperature taps affixed thereto; and FIGURE 2 is a schematic diagram of the present invention showing the utilization of the duct member of FIGURE 1.

Reference to FIGURE 1 shows an elbow duct member designated by the numeral 10, which duct member is relatively thin-walled and lightweight. Duct member 10 is cylindrical in cross section and has an exterior surface 11 and smooth inner surface 12. Duct member 10 also has an entrance end 13 and outlet end 14 through which fluid enters and exits respectively. Annular flanges 15 and 16 are fixed about ends 13 and 14 respectively to provide a means for connecting duct member 10 to other fluid passage members. The flanges may be secured to the exterior surface 11 by conventional methods, such as welding or the like.

The particular configuration of the duct member 10 shown in FIGURE 1 is such that the angle of the elbow is 110°. The 110° curvative, or arc, takes place between the points "a" and "c" which are shown along the centerline of the duct member 10. The outer radius $r_0$ of the elbow is 6.55 inches, the inner radius $r_1$ is 1.55 inches, and both $r_0$ and $r_1$ generate from a common point "O" of the drawing. A hole 17 is located in the wall of duct member 10 at the outer radius $r_0$ and at the midpoint "b" of the 110° arc of the elbow. Thus, the arc "a—b" is a 55° arc which locates the hole 17 at the radius $r_0$.

A pressure tap 18 is fixed to the exterior surface 11 so that it covers hole 17. The pressure tap 18 may be secured in place by usual and conventional means such as welding or the like. The tap itself contains a passage 19 which connects with hole 17, thus allowing fluid pressure within the duct member 10, and immediately adjacent hole 17, to be transmitted to the exterior of duct member 10. Similarly, a hole 22 is located at $r_1$ diametrically opposite hole 17. A pressure tap 23 is secured in place over hole 22, and a passage 24 in tap 23 will transmit fluid pressure within duct member 10, and immediately adjacent hole 22, to the exterior of duct member 10. The tap 22 is similar in its physical geometry to tap 18, and passage 24 appears as a dead end passage in the drawing merely because tap 23 is turned 90° with respect to tap 18.

A third hole 25 is positioned in the wall of the duct member 10, and is shown near end 14 of the duct member. A temperature tap 26 is secured in place over hole 25 and a passage 27 in tap 26 permits a temperature sensitive element, such as a thermocouple or the like, to be positioned therein in contact with a fluid flowing through duct member 10.

Referring now to FIGURE 2, the schematic diagram therein illustrates the apparatus associated with duct member 10 to measure the fluid flow and weight of fluid flow. As shown, a static pressure transducer "P" is connected to pressure tap 18. The "P" transducer produces an electrical signal indicative of the static presure of the fluid at hole 17 in duct member 10. The electrical signal, as shown by the representative wiring connection, is sent to a recorder. The static pressure transducer "P" may be a bellows type static pressure transduucer or other conventional type of static pressure transducer. One such transducer that can be used in the intsant apparatus is manufactured by the Statham Instrument Co. of Los Angeles, and is a commercially available item.

In addition to the use of a static pressure transducer, the instant apparatus also uses a plurality of differential pressure transducers designated $\Delta P_0$, $\Delta P_1$, and $\Delta P_2$. Each $\Delta P$ transducer is connected between pressure taps 18 and 23 to measure the difference in fluid pressure between hole 17 and hole 22 in duct member 10. Each $\Delta P$ transducer is capable of producing an electrical signal indicative of the pressure difference being measured, which signal is sent to the recorder. The $\Delta P$ transducers may also be bellows or other conventional type transducers. Again, the Statham Instrument Co. of Los Angeles markets a $\Delta P$ transducer which can be used here.

Since each $\Delta P$ transducer is connected to both pressure taps, they are in a parallel arrangement. A plurality of ΔP transducers are used in order to provide increased accuracy. Each ΔP transducer in FIGURE 2 has a different range of sensitivity so that at relatively low pressure differentials one ΔP transducer will provide the most accurate measurement while at a higher pressure differential another will be more accurate. By way of illustration, the ranges of the transducers could be as follows:

| | [1] P.s.i.d. |
|---|---|
| $\Delta P_0$ | 0–1 |
| $\Delta P_1$ | 0–3 |
| $\Delta P_2$ | 0–10 |

[1] Lbs. per sq. inch differential.

When such a plurality of ΔP transducers are utilized it becomes necessary to provide some means of protecting them from damage when the pressure differential exceeds their individual maximum operating pressure differentials. To provide this protection, valves 30, 31 and 32 are disposed in the fluid lines between the pressure tap 18 and the transducers $\Delta P_0$, $\Delta P_1$, and $\Delta P_2$ respectively. These valves are conventional on-off solenoid operated valves which are commercially available. To operate these valves, conventional static pressure switches $S_0$, $S_1$, and $S_2$ are electrically connected thereto as shown in FIGURE 2, switch $S_0$ controlling valve 30, $S_1$ controlling valve 31, and $S_2$ controlling valve 32. Each static pressure switch is also connected by fluid line to pressure tap 18. Thus, "static" pressure switches are used to protect the ΔP transducers from dangerous "pressure differentials," and this is made possible due to the fact that the static fluid pressure at pressure tap 18 is approximately equal to the fluid pressure differential between taps 18 and 23, which will become clear from the description of operation of the present invention.

Before passing to a discussion of the mechanics of the operation, however, some qualitative discussion will first be directed toward the fluid flow phenomena which underlie the operation and structure of the present invention. One characteristic common to the flow of fluid through a straight length of pipe is that the velocity of the fluid at the center of the pipe is greater than the velocity of the fluid at the sides of the pipe. This is easy to understand when it is remembered that the walls of the pipe impose a frictional drag on fluid flowing adjacent thereto. The result is a distribution of velocity across the pipe which roughly corresponds to the line "X" in FIGURE 1. This line or graph "X" shows the distribution of velocity across the pipe cross section "Z—Z." From graph "X" it is clearly seen that in a straight length of pipe the maximum fluid flow velocity occurs in the center of the pipe cross-section.

As fluid flows through a non-linear pipe section, such as an elbow for instance, the velocity distribution changes so that the maximum velocity is no longer at the center of the pipe section. Assuming that the direction of fluid flow is as shown by the arrows 36 and 37, and that the velocity distribution at cross-section "Z—Z" is substantially as shown by graph "X," then at cross-section "Y—Y" the velocity distribution will have become substantially that shown by graph "W." In graph "W" the maximum velocity occurs toward the outer radius of the elbow, and is no longer in the middle of the pipe cross section. Thus it appears that the elbow tends to throw the fluid outwardly. Another qualitative way to consider the phenomena is to realize that when the fluid flows around a curve it is subjected to centrifugal acceleration much like a ball being whirled around on the end of a string. Keeping this analogy in mind then, it is easy to see that the pressure in the fluid at the outside radius of the elbow is considerably greater than the pressure in the fluid at the inside radius of the elbow. Consequently, a fluid pressure difference exists between the outside and inside radius of the elbow, and it is possible to measure this pressure difference and calculate therefrom the rate of fluid flow through the elbow.

In order to achieve accurate results however, it is necessary to measure the pressure difference at carefully selected locations. While a fluid is flowing through the elbow, moving from cross section "Z—Z" to cross-section "Y—Y," its velocity distribution is changing and, as a consequence, considerable turbulence occurs. It has been experimentally verified, however, that after the fluid has progressed along the elbow curve for some distance then a smooth and nonturbulent laminar flow condition is established at the outer radius of the elbow. In the section in which this laminar flow occurs, the pressure difference between inside and outside radii can be accurately measured. This can be seen to be an important feature when it is recalled that the end result is the accurate determination of liquid oxygen remaining in a missile's tanks, and which may have to produce a missile thrust having an accuracy to within a few feet per second.

There may be some pressure variations occurring at the inner radius of the elbow, but since the fluid there is at a relatively low pressure then the pressure variations which may occur will be low pressure variations, with negligible effect on the total pressure difference being measured.

In the elbow shown in FIGURE 2 the laminar flow condition has been established by the time the fluid has flowed through an arc of 55°. Thus the pressure taps 18 and 23 are positioned at this point. It should be noted that this particular tap location would not be changed if the whole elbow was only—say 90° in curvature, instead of the 110° curvature shown. This is due to the fact that regardless of the overall curvature of the elbow, a fluid flowing therethrough will have to travel through a certain arc before a smooth laminar flow condition will be produced at the outer radius.

Naturally however, a change in diameter and/or radii of the elbow will have considerable effect on the usefulness of the present invention. Thus, a one inch diameter pipe bent through 90° at a radius of approximately 10 feet would be, for all practical purposes, a straight length of pipe with no pressure difference at all occurring across its diameter. It is to be understood then, that prime considerations are the use of an elbow duct which will provide a pressure difference across its diameter, and which will provide a section of laminar fluid flow at its outer radius of curvature.

As previously mentioned, such an elbow can be incorporated in a system to determine the fluid flow through the elbow. The following is an explanation of the operation of the system shown in FIGURE 2. The static pressure transducer "P" shown therein measures the fluid pressure at pressure tap 18 and sends a corresponding electrical signal to the recorder. Each of the ΔP transducers measures the pressure differential between pressure taps 18 and 23 and sends a corresponding signal to the recorder. Each static pressure switch "S" measures the static pressure at pressure tap 18 and is set to close its corresponding valve when the static pressure at tap 18 exceeds the maximum operating pressure differential of its corresponding ΔP transducer. As an example, assume that the operating range of the first ΔP transducer, $\Delta P_1$, is 0–1 p.s.i. Static pressure switch $S_0$ is designed or set to produce an electrical signal when the static pressure which it monitors reaches 1 p.s.i. When the static pressure at tap 18 reaches 1 p.s.i. then switch $S_0$ produces an electrical signal which is transmitted to and which closes valve 30. The closure of valve 30 disconnects transducer $\Delta P_1$ from pressure tap 18 so that additional increases in pressure will have no harmful effect on the transducer.

It should be noted that although the ΔP transducers measure the pressure differential between pressure taps 18 and 23, the switches "S" are operated by the pressure from tap 18 only. The pressure at tap 18 is a relatively high pressure compared with the pressure at tap 23. Consequently, the magnitude of the static pressure at tap 18 is always slightly larger than the pressure difference between taps 18 and 23. It can be seen then, that using this static pressure, which is always greater than the pressure differential, to operate the switches "S," automatically provides a safety tolerance which adds to the reliability of the protection afforded the ΔP transducers.

And finally, the temperature transducer "T" measures the temperature of the fluid flowing through the elbow and sends a corresponding electrical signal to the recorder. It is to be understood, however, that the recorder is only one terminus for the signals generated by the various transducers, and that it may be replaced by something else, connected in parallel with other units, etc.

Thus the system illustrated provides three different types of information, which information in the preferred embodiment of FIGURE 2 is sent to a recorder. The information supplied includes a static pressure ("P") measurement, a temperature ("T") measurement, and three differential pressure (ΔP) measurements. The particular ΔP measurement to be used in determining the flow of fluid through the elbow depends on the accuracy desired. For the most accurate results, the ΔP measurement used should be that provided by the ΔP transducer which has the greatest sensitivity at the pressure differential level indicated by the measurement. It is possible, of course, to provide switching between the ΔP transducers and the recorder so that only the most accurate measurement reaches the recorder if so desired.

After the "P," "T," and "ΔP" information is recorded, it can then be used to determine the "volume" flow of fluid and the "weight" flow of fluid through the elbow. The difference between the two is that one is a determination of the "volume" of fluid flowing through the elbow, and the other is a determination of the "weight" of fluid flowing through the elbow. It can be seen that once the "volume" fluid flow is found, then the "weight" fluid flow is calculated by merely multiplying the "volume" fluid flow by the density of the fluid.

An equation which yields accurate values of the average velocity of the fluid in the elbow is the following:

$$V = \sqrt{\frac{2g}{c_k} \cdot \frac{\Delta P}{\rho}}$$

where V is the average velocity in the cross section "Y—Y," "$\rho$" is the weight of fluid per unit volume, "ΔP" is the pressure differential measured between the two pressure taps, "$g$" is gravitational acceleration, and $C_k$ is a constant depending on the geometry of the elbow. One reference which sets forth the derivation of this equation is the "University of Illinois Bulletin No. 289, December 1936," page 23.

The volume of fluid flowing through the elbow is dependent on the velocity V as follows:

$$\frac{\text{Volume}}{\text{Unit time}} = V \cdot A$$

where A is the cross sectional area of the elbow. Thus, the flow may be expressed as:

$$\frac{\text{Volume}}{\text{Unit of time}} = A \sqrt{\frac{2g}{c_k}} \cdot \sqrt{\frac{\Delta P}{\rho}}$$

and the "weight" fluid flow may be expressed as:

$$\frac{\text{Weight}}{\text{Unit of time}} = A \sqrt{\frac{2g}{c_k}} \cdot \sqrt{\rho \Delta P}$$

In these equations, the quantity ΔP is provided by the ΔP transducers, and the quantity "$\rho$," the weight density, is provided by the "P" and "T" transducers through appropriate relationships, such as $$\rho = \frac{P}{RT}$$

for a gas, where R is the gas constant.

Thus it is seen that the parameters "P," "T," and "ΔP" will provide rate of flow information which can be converted to total volume and/or weight figures merely by multiplying by the quantity of time involved. In order to use the equations effectively, however, the nature of the constant $C_k$ should be understood. It can be mathematically defined as follows:

$$C_k = \frac{2D}{r}$$

where D is the diameter of the elbow and r is the radius corresponding to the mass center of fluid in the elbow at cross section "Y—Y." It would appear then that more theoretical calculations must be made in order to arrive at a value for $C_k$. This is not necessary however, for $C_k$ can be found experimentally by calibrating the elbow flow meter with a precision orifice type meter. This is the preferred approach, for it enables the elbow flow meter to be calibrated "in place," i.e., in the ducting system in which it will actually be used on a missile, aircraft or the like.

The calibration is achieved by placing a precision orifice flow meter in the ducting system where it will measure the flow which must also pass through the elbow. Comparison of the results will yield an actual value for $C_k$, as opposed to a theoretically determined value. This is felt to be the better course to follow, for the results desired are actual, not theoretical, results.

It should be noted that precise calibration with an orifice flow meter is made possible by the fact that the equations used in conjunction with such a flow meter have the same form as those used with the present invention. As an example, the weight flow through an orifice meter is determined by an equation of the form $$\frac{\text{Weight}}{\text{Unit of time}} = K \cdot \sqrt{\rho \Delta P}$$

which is exactly like the equation used with the present invention, save for the constants involved.

The present invention thus constitutes a versatile and accurate flow measuring apparatus, of which certain preferred embodiments have been specifically disclosed, it being understood that the invention is not limited thereto as many variations will be readily apparent to those skilled in the art and the invention is to be given its broadest possible interpretation within the terms of the following claim.

What we claim is:

An elbow type flow metering device comprising a duct member having a cylindrical, in cross-section, interior passage, said passage having an elbow configuration with inner and outer radii of curvature, said passage having a smooth wall to provide at least one section in which substantially turbulence free laminar fluid flow can occur at said outer radius, a first pressure tap disposed to intersect said section at said outer radius, a second pressure tap intersecting said passage substantially diametrically opposite said first pressure tap, a temperature tap intersecting said passage, a static pressure transducer connected to said first pressure tap, a plurality of differential pressure transducers, each differential pressure transducer being connected between said first and second pressure taps in parallel arrangement with the other of said plurality of differential pressure transducers, each of said plurality of differential pressure transducers having a unique maximum operating pressure differential, a plurality of pressure responsive safety means for disconnecting the differential pressure transducers from between said first and second pressure taps before their individual unique maximum operating pressure differentials are exceeded, a temperature transducer connected to said temperature tap, a recorder, and each transducer being electrically connected to said recorder and providing it with electrical signals indicative of the quantity being measured by the transducer.

References Cited in the file of this patent
UNITED STATES PATENTS

| | | |
|---|---|---|
| 1,905,558 | Foote | Apr. 23, 1933 |
| 2,404,868 | Silversten | July 30, 1946 |

FOREIGN PATENTS

| | | |
|---|---|---|
| 12,946 | Great Britain | Nov. 4, 1909 |

OTHER REFERENCES

The Hyperbo-Electric Flow Meter, an article in "Power," vol. 57, No. 26, June 26, 1923, pages 1024 and 1025. (Copy in Scientific Library.)